United States Patent [19]

Nakano et al.

[11] Patent Number: 4,764,181
[45] Date of Patent: Aug. 16, 1988

[54] PROCESS FOR PRODUCING AN ELECTROLYTIC CAPACITOR

[75] Inventors: Tsunetomo Nakano; Kohei Nakajima; Kazuaki Nishio, all of Ichihara; Toshio Maruyama, Nagai; Hiroshi Shimada, Nagai; Kiyoshi Sakamoto, Nagai; Kumiko Narisawa, Nagai, all of Japan

[73] Assignees: Ube Industries Ltd.; Marcon Electronics Corp. Ltd.; High Man Parts Corp. Ltd., Yamaguchi & Yamagata, Japan

[21] Appl. No.: 821,416

[22] Filed: Jan. 22, 1986

[30] Foreign Application Priority Data

Jan. 24, 1985 [JP] Japan .................................. 60-012205
Sep. 30, 1985 [JP] Japan .................................. 60-216771

[51] Int. Cl.$^4$ .............................................. H01G 9/00
[52] U.S. Cl. .................................... 29/570.1; 361/433
[58] Field of Search ................. 29/25.41, 25.42, 570.1; 361/433

[56] References Cited

U.S. PATENT DOCUMENTS

| | | | |
|---|---|---|---|
| 3,940,667 | 2/1976 | Pearce | 29/570 |
| 4,039,905 | 8/1977 | Pearce et al. | 361/433 |
| 4,099,218 | 7/1978 | Klein et al. | 361/433 |

FOREIGN PATENT DOCUMENTS

| | | | |
|---|---|---|---|
| 47-41141 | 10/1972 | Japan | 2/570 |
| 47-49142 | 12/1972 | Japan | 29/570 |

Primary Examiner—O. Chaudhuri
Attorney, Agent, or Firm—Burgess, Ryan & Wayne

[57] ABSTRACT

An electrolytic capacitor having very thin spacer layers is produced by a process in which at least two of the surfaces of an anode valve action metal foil and a cathode metal foil are coated with a photosensitive polymer resin solution; the resultant photosensitive polymer resin solution layers are solidified; the solidified photosensitive polymer resin coatings are masked with a negative or positive masking film having a desired pattern and irradiated with an actinic radiation to partly harden the photosensitive polymer resin coatings in accordance with the masking pattern; after removing the masking film, the irradiated photosensitive polymer resin coatings are developed with a developing liquid to provide spacer layers consisting of hardened portions of the photosensitive polymer resin coatings; the anode and cathode metal foils having the spacer layers are superposed on each other in such a manner that at least one spacer layer is located between the superposed anode and cathode metal foils and at least one other spacer layer is located on at least one of the outside surfaces of the superposed anode and cathode metal foils, to provide a laminate; the laminate is wound into a capacitor element; and then the capacitor element is impregnated with an electrolyte.

14 Claims, 3 Drawing Sheets

PROCESS FOR PRODUCING AN ELECTROLYTIC CAPACITOR

BACKGROUND OF THE INVENTION

1. Field of the Invention

The present invention relates to a process for producing an electrolytic capacitor. More particularly, the present invention relates to a process for producing an electrolytic capacitor by utilizing a photosensitive polymer resin to provide very thin spacer layers interposed between an anode metal foil and a cathode metal foil. The process of the present invention is useful to provide a small size, high efficiency electrolytic capacitor without using a paper spacer.

2. Description of the Related Art

It is known to produce a conventional electrolytic capacitor by connecting a pair of electrode tabs consisting of, for example, aluminum, to a pair of anode and cathode metal foils consisting of, for example, aluminum, superimposing alternately two spacers and the anode and cathode metal foils, in the order of, for example, the anode foil, a spacer, the cathode foil, and a spacer, by winding the resultant laminate to provide a capacitor element, and by impregnating the capacitor element with an electrolyte.

The electrolyte-impregnated capacitor element is placed in a case and an opening of the case is hermetically sealed.

The purpose of interposing the spacers between the anode and cathode metal foils is to space and insulate the anode and cathode from each other and to hold the electrolyte. That is, spacers are important elements for the electrolytic capacitor.

In conventional electrolytic capacitors, the spacers are usually made from kraft paper.

Conventional spacers consisting of kraft paper make the production of a small size capacitor difficult due to the following features of the kraft paper:

(1) The kraft paper has a relatively large density of from 0.3 to 0.8 g/cm$^3$.

(2) In the kraft paper, pulp fibers are in the depressed flat form. Therefore, the kraft paper exhibits a relatively high apparent specific resistance and an unsatisfactory tan δ (tangent of loss angle) property.

(3) It is difficult to make the thickness of the kraft paper less than 30 μm due to restrictions in paper-making technology.

In order to eliminate the disadvantages of the kraft paper spacer, it has been attempted to replace the kraft paper with a low density manila paper. Capacitors containing manila paper spacers exhibit an improved tan δ property and are produced and used in a limited field.

However, manila paper is very expensive, being priced several times more than kraft paper. Also, in order to make the mechanical strength of manila paper high enough to resist the capacitor-producing process, especially the winding procedure, the manila paper must have a relatively large thickness of 40 μm or more. This requirement causes the resultant capacitor to be of a relatively large size.

Additionally, the use of paper spacers, whether of kraft paper or of manila paper, complicates and reduces the efficiency of the process and apparatus for arranging the anode and cathode metal foils and the spacers to provide a laminate and for winding the laminate.

SUMMARY OF THE INVENTION

An object of the present invention is to provide a process for producing an electrolytic capacitor having satisfactory electric properties without using spacers made of paper.

Another object of the present invention is to provide a process for producing an electrolytic capacitor enabling production of a small size, light weight electrolytic capacitor through easy procedures and at a low cost.

The above-mentioned objects are attained by the process of the present invention, which comprises the steps of coating at least two of the surfaces of an anode valve action metal foil and a cathode metal foil with a solution of a photosensitive polymer resin; drying the resultant coated photosensitive polymer resin solution layers; masking each of the resultant photosensitive polymer resin coatings with a negative or positive masking film having a desired pattern; irradiating each of the masked photosensitive polymer resin coatings with actinic radiation, to partly harden the photosensitive polymer resin coatings in accordance with the masking pattern; removing the masking film from each partly hardened photosensitive polymer resin coating; developing the irradiated photosensitive polymer resin coatings with a developing liquid to remove nonhardened portions of the photosensitive polymer resin coatings and to provide spacer layers consisting of the hardened portions of the photosensitive polymer resin coatings in the masking pattern; superposing the anode and cathode metal foils having the spacer layers on each other in such a manner that at least one spacer layer comes between the superposed anode and cathode metal foils and at least one other spacer layer comes on at least one of the outside surfaces of the superposed anode and cathode metal foils, to provide a laminate; winding the laminate to provide a capacitor element; and impregnating the capacitor element with an electrolyte.

DESCRIPTION OF THE PREFERRED EMBODIMENT

Figure 1:
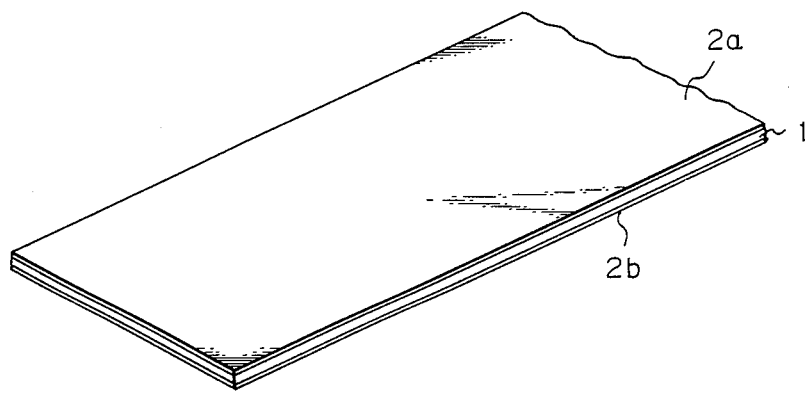
FIG. 1 is a schematic view of a metal foil having photosensitive polymer resin coatings formed on the upper and lower surfaces of the foil.

In the process of the present invention, an electrolytic capacitor is produced from an anode metal foil, a cathode metal foil, and a photosensitive polymer resin.

The anode foil is made from a valve action metal selected from, for example, aluminum, tantalum, titanium, and niobium. The cathode foil is made from a metal, for example, aluminum, tantalum, titanium, or niobium.

Usually, the anode and cathode metal foils have a thickness of from 10 to 200 μm.

In order to enhance the coating property of the surface of the anode metal foil, the surface may be roughened by treatment with an etching liquid containing hydrochloric acid and a halogenated compound to increase the surface area of the anode metal foil. The roughened surface of the anode metal foil may be anodically oxidized to cover the metal foil surface with an anodic oxide layer.

Also, the surface of the cathode metal foil is roughened with the etching liquid to increase the surface area of the cathode metal foil.

The photosensitive polymer resin usable for the process of the present invention is not limited to a specific type of photosensitive polymer resin as long as it can be hardened into a crosslinked and insolubilized polymer resin when it is irradiated with actinic rays. Usually, the photosensitive polymer resin consists of at least one member selected from the group consisting of photosensitive, heat-resistant aromatic polyimide resins, for example, compositions containing, as principal components, polycondensation products of acrylic radical-containing aromatic diamine compounds with aromatic tetracarbonylic acid compounds, as disclosed in Japanese unexamined patent publication (Kokai) Nos. 59-108,031, 59-220,729, 59-220,730, and 60-072,925; photosensitive, heat-resistant aromatic polyamide resins, for example, compositions containing, as principal components, polycondensation products of acrylic radical-containing aromatic diamine compounds with aromatic dicarboxylic acid compounds, as disclosed in Japanese unexamined patent publication (Kokai) No. 60-006,727; and photosensitive, heat-resistant epoxy polymer resins, for example, epoxidized phenol resins having acrylic radicals.

Preferably, the photosensitive polymer resin is selected from photosensitive aromatic polyamide resins and photosensitive aromatic polyimide resins which have a number of photosensitive ethylenically unsaturated groups and which exhibit an excellent heat-resistance at a temperature of from 100° C. to 300° C. and a satisfactory flame-retardant property.

In the first step of the process of the present invention, at least two of the surfaces of an anode and cathode metal foils are coated with a solution of the photosensitive polymer resin in an organic solvent.

The surfaces to be coated may be two surfaces of either the anode or cathode metal foil, one surface of the anode metal foil and one surface of the cathode metal foil, or all four surfaces of the anode and cathode metal foils.

The solution is prepared by evenly dissolving the photosensitive polymer resin preferably in an organic polar solvent consisting of, for example, at least one member selected from N,N-dimethylformamide, N,N-diethylformamide, N,N-dimethylacetamide, N,N-diethylacetamide, N-methyl-2-pyrrolidone, dimethylsulfoxide, hexamethylphosphoramide and diglyme, in a concentration of, for example, 5% to 40%.

The photosensitive polymer resin solution is applied to the desired surfaces of the anode and/or cathode metal foils at a temperature of from 5° C. to 50° C., preferably from 10° C. to 40° C. to form an even layer of the solution.

The coating procedure can be carried out by any known coating method, for example, roller coating, doctor blade coating, bar coater coating, or spin coating, as long as the resultant coated solution layer has an even thickness.

The photosensitive polymer resin solution layers are dried by gradually evaporating the solvent from the solution layers. When the solution layers are solidified, it is preferable that the thickness of the resultant photosensitive polymer resin coatings be in the range of from 0.1 to 40 μm, more preferably, from 0.5 to 30 μm, still more preferably, from 2 to 20 μm.

The drying step is carried out preferably at a temperature of from 20° C. to 200° C., more preferably, from 30° C. to 150° C., for 0.1 to 100 minutes, more preferably, 0.5 to 30 minutes.

Referring to FIG. 1, two surfaces of a cathode metal foil 1 are coated with solidified photosensitive polymer resin coatings 2a and 2b. Each of the dried photosensitive polymer resin coatings is masked by a negative or positive masking film having a desired pattern.

Figure 2:
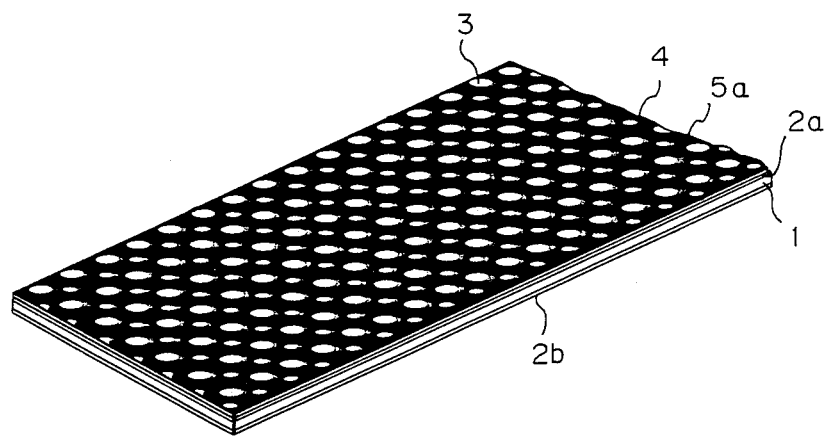
FIG. 2 is a schematic view of metal foil having two photosensitive polymer resin coatings as shown in FIG. 1 and masked with a masking film having a number of transparent portions.

Referring to FIG. 2, the photosensitive polymer resin coating 2a is masked by a masking film 4 composed of an opaque matrix portion 5a and a number of block-shaped transparent portions 3 dispersed evenly in the matrix portion 5a and spaced from each other.

The masking film may be composed of a transparent matrix portion and a number of block-shaped opaque portions dispersed evenly in the matrix portion and spaced from each other.

In the masking film, it is preferable that the total area of the transparent portions thereof be in a proportion of from 20% to 70%, more preferably from 25% to 60%, to the entire area of the masking film.

The negative or positive masking film is not limited to a specific type of material, as long as the film carries a desired pattern.

Also, a surface of the masking film which comes into contact with the photosensitive polymer resin coating may be adhesive. This adhesive surface is effective to maintain the masking film at a desired position on the photosensitive polymer resin coating.

Each masked photosensitive polymer resin coating is irradiated by active radiation, for example, visible rays or ultraviolet rays, to partly (locally) harden (crosslink) the photosensitive polymer resin coating in accordance with the mask pattern. That is, only the actinic ray-irradiated portions of the photosensitive polymer resin coatings are cross-linked and insolubilized.

Therefore, the masking film is removed and the resultant partly hardened photosensitive polymer resin coatings are developed with a developing liquid at a temperature of preferably 0° C. to 80° C. to remove non-irradiated and non-hardened portions of the coatings and to provide spacer layers consisting of the hardened portions of the coatings in the mask pattern.

Figure 3:
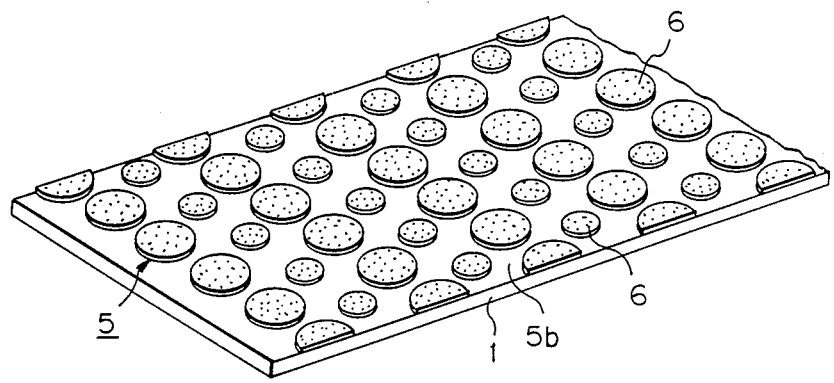
FIG. 3 is a schematic view of an embodiment of the spacer layer produced on a metal foil surface in accordance with the process of the present invention.
Figure 4:
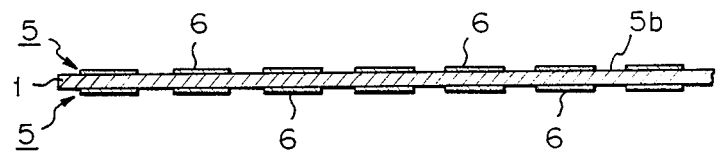
FIG. 4 is a cross-sectional view of the spacer layers formed on two surfaces of the metal foil, as shown in FIG. 3.

In an example of the spacer layer of the present invention, referring to FIGS. 3 and 4, a spacer layer 5 formed on a metal foil 1 consists of a number of flat circle blocks 6 distributed and fixed on the surface of the metal foil 1 and spaced from each other. In other words, the surface of the metal foil 1 is partly covered by a number of flat circle blocks 6. Non-covered portion 5b of the metal foil surface is exposed to the atmosphere.

Figure 5:
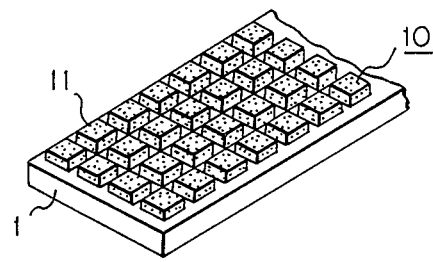
FIG. 5 is a schematic view of another embodiment of the spacer layers produced in accordance with the process of the present invention.

In another example of the spacer layer of the present invention, referring to FIG. 5, a spacer layer 10 is composed of a number of flat square blocks 11 spaced from each other and evenly distributed and fixed on the surface of a metal foil 1.

Figure 6:
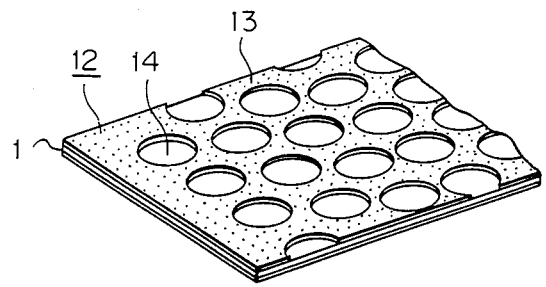
FIG. 6 is a schematic view of still another embodiment of the spacer layers produced in accordance with the process of the present invention.

In still another example of the spacer layer of the present invention as shown in FIG. 6, a spacer layer 12 is composed of a flat matrix layer 13 fixed on the surface of the metal foil 1 and having a number of circular holes 14 spaced from each other and evenly distributed in the matrix.

Figure 7:
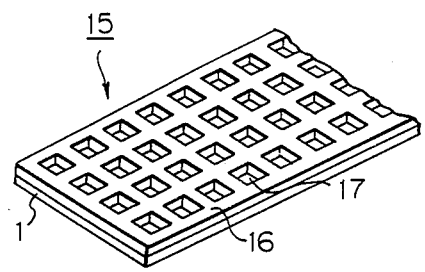
FIG. 7 is a schematic view of a further embodiment of the spacer layers produced in accordance with the process of the present invention.

In a further example of the spacer layer of the present invention as shown in FIG. 7, a spacer layer 15 is composed of a flat matrix layer 16 having a number of flat square holes spaced from each other and evenly arranged in the matrix.

The spacer layers as shown in FIGS. 6 and 7 may be modified by connecting the holes to each other through a number of thin channels formed in the matrix layer.

On the bottoms of the holes and channels, portions of the metal foil are exposed to the outside.

In the spacer layer composed of a number of flat blocks spaced from each other, the flat blocks may be of any shape, for example, dots, points, circles, ovals, semicircles, quarter-circles, lunettes, stars, L-shapes, crosses, teragons (regular squares, rhomboids, and rectangles), triangles (regular triangles and isosceles triangles), and hexagons. The flat blocks preferably have a longest length of from 1 to 2000 $\mu$m, more preferably, from 10 to 1000 $\mu$m, and are separated from each other at a space of from 0.01 to 10 mm, more preferably from 0.1 to 5 mm, further preferably from 0.1 to 1 mm.

Each flat block preferably has a surface area of from $1 \times 10^{-7}$ to 10 mm$^2$, more preferably from $1 \times 10^{-5}$ to 1 mm$^2$.

In the spacer layers of the present invention, the flat blocks or the flat matrix layers preferably have a thickness of from 0.1 to 40 $\mu$m, more preferably, from 0.5 to 30 $\mu$m, still more preferably, from 1 to 20 $\mu$m.

Also, it is preferable that the spacer layers have a total area corresponding to 20% to 70%, more preferably, from 25% to 60%, of the entire area of the photosensitive polymer resin coating.

In other words, in the spacer layer-coated anode or cathode metal foil surface, it is preferable that the total area of portions of the metal foil surface exposed to the outside be from 30% to 80%, more preferably, from 40% to 75%, of the entire area of the metal foil surface.

The spacer layer is heat-treated at a temperature of from 100° C. to 400° C., preferably, from 120° C. to 250° C. for about 5 to 60 minutes before the next superposing step, if necessary. The heat treatment is effective for enhancing the bonding strength of the spacer layer to the metal foil surface and for improving the mechanical strength and the chemical resistance of the spacer layer.

Next, the anode and cathode metal foils having the spacer layers are superposed on each other in such a manner that at least one spacer layer comes between the superposed anode and cathode metal foils and at least one other spacer layer comes on at least one of the outside surfaces of the superposed anode and cathode metal foils, to provide a laminate.

Figure 8:
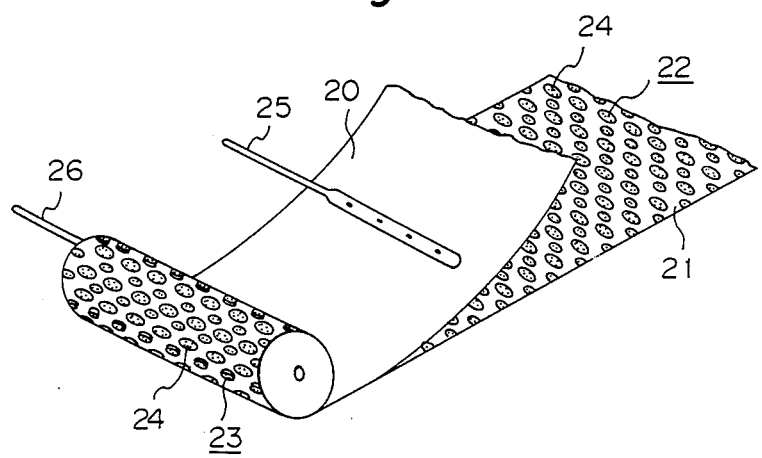
FIG. 8 is an explanatory schematic view of the superposing and winding step in the process of the present invention.

For example, referring to FIG. 8, an anode metal foil 20 is superposed on a cathode metal foil 21 having upper and lower spacer layers 22 and 23, respectively formed on the upper and lower surfaces of the foil 21 and each consisting of a number of flat circular blocks 24 spaced from each other, in such a manner that the upper spacer layer 22 comes between the anode and cathode metal foils 20 and 21 and the lower spacer layer 23 comes on the lower surface of the cathode metal foil 21.

In another example, an anode metal foil having a spacer layer formed on a lower surface of the anode metal foil is superposed on a cathode metal foil having a spacer layer formed on a lower surface of the cathode metal foil, in such a manner that the spacer layer of the anode metal foil comes on the upper surface of the cathode metal foil.

In still another example, an anode metal foil having upper and lower spacer layers formed on the upper and lower surfaces of the anode metal foil is superposed on a cathode metal foil having upper and lower spacer layers formed on the upper and lower surface of the cathode metal foil in such a manner that the lower spacer layer of the anode metal foil comes into contact with the upper spacer layer of the cathode metal foil.

The resultant laminate is wound to provide a capacitor element.

For example, referring to FIG. 8, a laminate consisting of an anode metal foil 20, an upper spacer layer 22, a cathode metal foil 21, and a lower spacer layer 23 superposed in the above-mentioned order, is wound so that the lower spacer layer 23 comes into contact with the upper surface of the anode metal foil 20.

In the resultant capacitor element, the upper surface of the anode metal foil 20 is spaced and insulated from the lower surface of the cathode metal foil 21 through the lower spacer layer 23 and the lower surface of the anode metal foil 20 is spaced and insulated from the upper surface of the cathode metal foil 21 through the upper spacer layer 22.

The upper and lower spacer layers 22 and 23 have free spaces formed between the flat blocks 24. The free spaces in the spacer layer can receive therein an electrolyte.

In the superposing and/or winding step, referring to FIG. 8, an anode tab 25 is connected to the anode metal foil 20 and a cathode tab 26 is connected to the cathode metal foil 21.

The capacitor element is impregnated with an electrolyte which is contained in the free spaces in the spacer layers.

The electrolyte may be selected from usual electrolytes, for example, solutions of organic carboxylates, for example, ammonium carboxylates in ethylene glycol.

The electrolyte-impregnated capacitor element is placed in a container and the opening of the container is hermetically sealed, to provide an electrolytic capacitor.

In the process of the present invention in comparison with the conventional processes wherein kraft or manila paper is used as a spacer layer, there is the advantage that a spacer layer having a very small thickness, a satisfactory insulating property, and a sufficient capacity for containing the electrolyte, can be produced by easy and simple procedures at a high productivity. The process of the present invention is valuable in that it can produce a small size, high efficiency electrolytic capacitor.

The present invention will be illustrated in detail by the following examples and comparative examples.

EXAMPLE 1

An anode metal foil was prepared by subjecting aluminum foil having a thickness of 90 $\mu$m to a surface-roughening treatment to increase the surface area of the foil and then by subjecting the surface-roughened foil to an anodic oxidizing treatment.

A cathode metal foil was prepared by surface-roughening an aluminum foil having a thickness of 50 $\mu$m.

Two surfaces of the cathode metal foil were coated with a solution of 10% by weight of a photosensitive aromatic polyimide resin (which was a resinous composition containing, as a principal component, a polycondensation product of equimolar amounts of a diamine component consisting of 70 molar % of 2-(3,5-diaminobenzoyloxy)ethyl methacrylate and 30 molar % of m-xylene diamine and a tetracarboxylic acid component consisting of 2, 3, 3', 4'-biphenyl-tetracarboxylic acid) in N-methyl-2-pyrrolidone, by means of a roller coating apparatus. The photosensitive aromatic polyimide resin solution exhibited a rotation viscosity of 100 cps at a temperature of 25° C.

The resultant solution layers were dried at a temperature of 80° C. for about 10 minutes to provide photosensitive aromatic polyimide resin coatings having a thickness of 2 $\mu$m and formed on the two surfaces of the cathode metal foil.

A negative plastic masking film having a number of transparent large circular portions having a diameter of 0.5 mm and a number of transparent small circular portions having a diameter of 0.3 mm, was placed on one of the photosensitive aromatic polyimide resin coatings. In the masking film, the large transparent circular portions were arranged in a grid pattern at intervals of 0.75 mm. The small transparent circular portions were arranged evenly in a grid pattern among the large transparent circular portions, as shown in FIG. 2. Ultraviolet rays having a wavelength from 300 to 450 nm) were irradiated from a mercury vapor lamp to the photosensitive aromatic polyimide resin through the masking film for 3 minutes. The same ultraviolet ray-irradiating procedures as those mentioned above were applied to the other photosensitive aromatic polyimide resin coating of the cathode metal foil.

The resultant partly hardened photosensitive aromatic polyimide resin coatings were developed with a developing liquid consisting of a mixture of 85 parts by weight of N-methyl-2-pyrrolidone and 15 parts by weight of methyl alcohol for 2 minutes, while applying an ultrasonic wave treatment to the coatings, to remove non-hardened portions of the coatings. The developed coatings were rinsed with methyl alcohol for 10 seconds and then dried in the atmospheric air at room temperature. The dried coatings were heat-treated at a temperature of 180° C. for 30 minutes.

The resultant spacer layers on the cathode metal foil consisted of a number of large flat circular blocks having a diameter of 0.5 mm and small flat circular blocks having a diameter of 0.3 mm which blocks had a thickness of 2 $\mu$m. In the spacer layers, the large flat circular blocks were arranged in a grid pattern at intervals of 0.75 mm. The small flat circular blocks were arranged in a grid pattern evenly among the large blocks, as shown in FIG. 3.

In each spacer layer, the ratio of the total area of the flat circular blocks to the entire area of the corresponding metal foil surface was 47%.

The anode metal foil was superposed on the cathode metal foil having upper and lower spacer layers formed on the upper and lower surfaces of the cathode metal foil, in the manner as shown in FIG. 8.

The resultant laminate was wound in the manner as shown in FIG. 8 to provide a capacitor element.

The capacitor element was impregnated with an electrolyte-containing ammonium adipate and ethylene glycol. The electrolyte-impregnated capacitor element was converted into a small size electrolytic capacitor (rating: 25 V, 220 $\mu$F.) by usual procedures.

The resultant electrolytic capacitor in Example 1 will be referred to as capacitor A hereinafter.

COMPARATIVE EXAMPLE 1

The same procedures as those described in Example 1 were carried out except that the spacer layers were prepared from manila paper having a thickness of 40 $\mu$m.

The resultant comparative electrolytic capacitor will be referred to as comparative capacitor B hereinafter.

Comparing capacitor A with comparative capacitor B, it was found that the volume of capacitor A corresponds to about 60% of the volume of comparative capacitor B. That is, the process of the present invention enabled an about 40% reduction of the volume of the conventional electrolytic capacitor.

Figure 9:
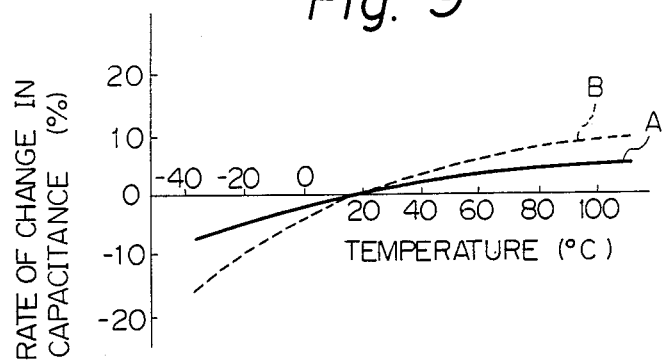
FIG. 9 is a diagram showing the relationship between the temperature and rate of change of capacitance of a capacitor produced by the process of the present invention and a comparative capacitor.

FIG. 9 shows the relationship between the temperature (°C.) and rate of change (%) in capacitance of the capacitor A and the comparative capacitor B.

Figure 10:
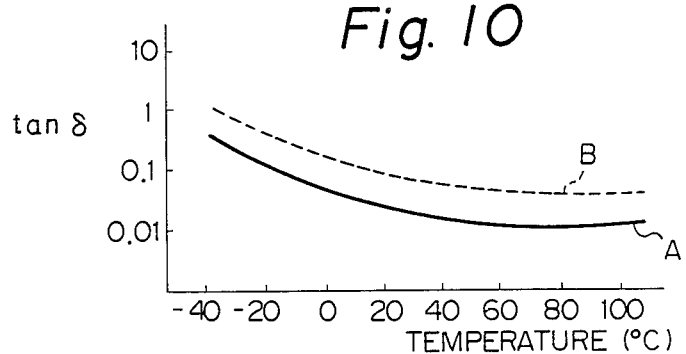
FIG. 10 is a diagram showing the relationship between the temperature and tan δ of a capacitor produced by the process of the present invention and a comparative capacitor.

FIG. 10 shows the relationship between the temperature (°C.) and tan $\delta$ (%) of the capacitor A and comparative capacitor B.

Figure 11:
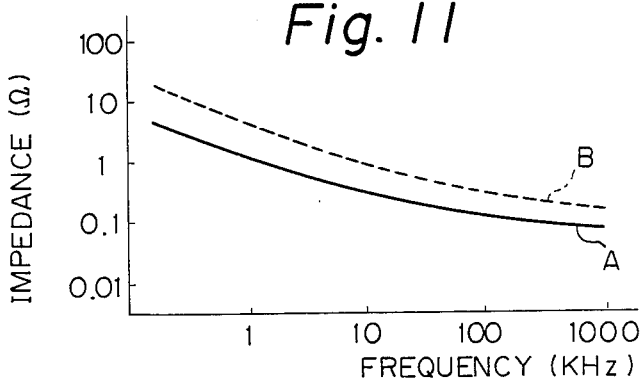
FIG. 11 is a diagram showing the relationship between the frequency and impedance of a capacitor produced by the process of the present invention and a comparative capacitor.

FIG. 11 shows the relationship between the frequency (KHz) and impedance ($\Omega$) of the capacitor A and comparative capacitor B.

FIGS. 9, 10, and 11 clearly indicate that the capacitor A produced in accordance with the process of the present invention exhibits excellent stability in rate of change in capacitance in relation to temperature, in tan $\delta$ in relation to temperature, and in impedance in relation to frequency, to those of the comparative capacitor B.

EXAMPLE 2

The same procedures as those described in Example 1 were carried out, with the following exception.

The masking film consisted of an aluminum foil having a number of circular apertures having a diameter of 0.5 mm and arranged in a grid pattern at intervals of 0.75 mm.

Ultraviolet ray-irradiation was carried out for 10 minutes from a mercury vapor lamp (wavelength: 300 to 450 nm).

The heat treatment for the resultant spacer layers was carried out at a temperature of 200° C. for 30 minutes.

The resultant spacer layers consisted of a number of flat circular blocks having a thickness of 2 μm and a diameter of 0.5 mm and arranged in right angles at intervals of 0.75 mm. The ratio of the total area of the flat circular blocks to the entire area of the corresponding metal foil surface was about 35%.

The resultant electrolytic capacitor (rating: 25 V, 220 μF.) will be referred to as capacitor C hereinafter.

COMPARATIVE EXAMPLE 2

The same procedures as those described in Example 2 were carried out except that the spacer layer consisted of manila paper having a thickness of 40 μm.

The resultant comparative electrolytic capacitor (rating: 25 V, 220 μF.) will be referred to as comparative capacitor D hereinafter.

The volume of the capacitor C was about 20% smaller than that of the comparative capacitor D.

For the purpose of comparison in flame-resistance, 20 capacitors C and 20 comparative capacitors D were subjected to a destructive test in which a voltage of 50 V (which corresponded to twice the rating voltage 25 V of the capacitors C and comparative capacitors D) was applied to them.

Among the 20 comparative capacitors D, all of them generated sparks or flashes and were destroyed and eight were ignited and continuously burnt.

Among the 20 capacitors C produced in accordance with the process of the present invention, all of them generated sparks or flashes and were destroyed. None of them was ignited or burnt.

We claim:

1. A process for producing an electrolytic capacitor comprising the steps:

coating at least two of the surfaces of an anode valve action metal foil and a cathode metal foil with a solution of a photosensitive polymer resin;

drying the resultant coated photosensitive polymer resin solution layers;

masking each of the resultant photosensitive polymer resin coatings with a negative or positive masking film having a predetermined pattern;

irradiating each of the masked photosensitive polymer resin coatings with actinic radiation, to partly harden the photosensitive polymer resin coatings in accordance with the masking film pattern;

removing the masking film from each partly hardened photosensitive polymer resin coating;

developing the irradiated photosensitive polymer resin coatings with a developing liquid to remove nonhardened portions of the photosensitive polymer resin coatings and to provide spacer layers consisting of the hardened portions of the photosensitive polymer resin coatings;

superposing the anode and cathode metal foils having the spacer layers on each other in such a manner that at least one spacer layer comes between the superposed anode and cathode metal foils and at least one other spacer layer comes on at least one of the outside surfaces of the superposed anode and cathode metal foils, to provide a laminate;

winding the laminate to provide a capacitor element; and impregnating the capacitor element with an electrolyte.

2. The process as claimed in claim 1, wherein the anode valve action metal foil consists of a member selected from the group consisting of aluminum, tantalum, titanium, and niobium.

3. The process as claimed in claim 1, wherein the cathode metal foil consists of a member selected from the group consisting of aluminum, tantalum, titanium, and niobium.

4. The process as claimed in claim 1, wherein the photosensitive polymer resin consists of at least one member selected from photosensitive heat-resistant aromatic polyimide resins, photosensitive heat-resistant aromatic polyamide resins, and photosensitive heat-resistant epoxy polymer resins.

5. The process as claimed in claim 1, wherein the spacer layer is heat-treated at a temperature of from 100° C. to 400° C. before the superposing step.

6. The process as claimed in claim 1, wherein the actinic radiation is selected from visible rays and ultraviolet rays.

7. The process as claimed in claim 1, wherein, in the negative or positive masking film, the ratio of the total area of transparent portions in the masking film to the entire area of the masking film is in the range of 20% to 70%.

8. The process as claimed in claim 1, wherein the spacer layer has a total area in a proportion of 20% to 70% to the entire area of the photosensitive polymer resin coating.

9. The process as claimed in claim 1, wherein the spacer layer has a thickness of 0.1 to 40 μm.

10. The process as claimed in claim 1, wherein the spacer layer consists of a number of flat blocks separate from each other.

11. The process as claimed in claim 10, wherein the flat blocks have a largest length in the range of from 1 to 2000 μm.

12. The process as claimed in claim 10, wherein the flat blocks are separated from each other with a space of from 0.01 to 10 mm.

13. The process as claimed in claim 10, wherein each flat block has a surface area of from $1 \times 10^{-7}$ to 10 mm$^2$.

14. The process as claimed in claim 10, wherein the spacer layer consists of a flat layer having a number of holes separate from each other.

* * * * *